July 28, 1931.   E. GRASSOT   1,816,773
DEVICE RESPONSIVE TO UNBALANCE IN POLYPHASE CIRCUIT VOLTAGES
Original Filed Aug. 13, 1926
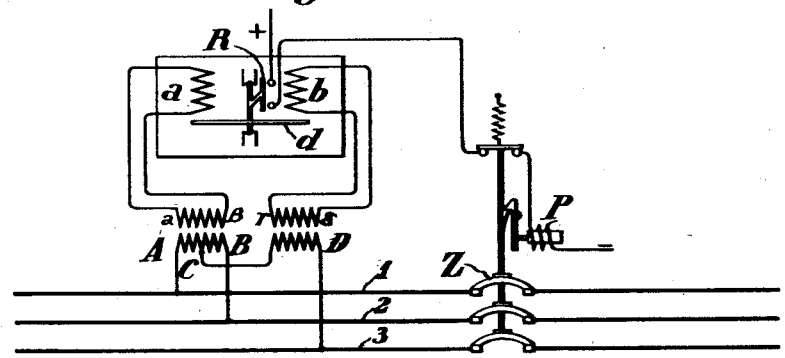
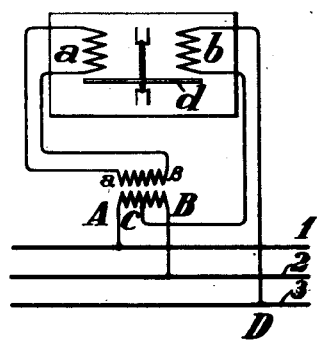
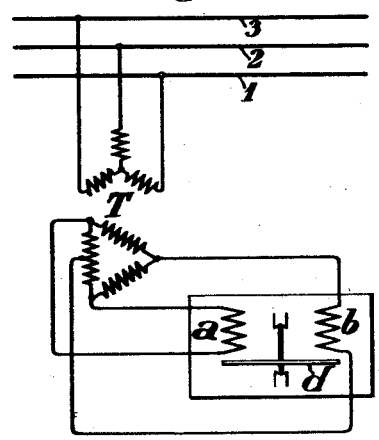
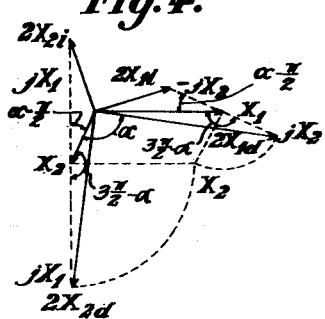
Inventor:
Emile Grassot,
by Charles E. Mullen
His Attorney.

Patented July 28, 1931

1,816,773

UNITED STATES PATENT OFFICE

EMILE GRASSOT, OF MEUDON, FRANCE, ASSIGNOR TO GENERAL ELECTRIC COMPANY, A CORPORATION OF NEW YORK

DEVICE RESPONSIVE TO UNBALANCE IN POLYPHASE CIRCUIT VOLTAGES

Original application filed August 13, 1926, Serial No. 129,032, and in France December 23, 1925. Divided and this application filed July 1, 1929. Serial No. 375,300.

My invention relates to improvements in devices responsive to unbalance in polyphase circuit voltages and more particularly relays, metering apparatus, etc., and an object of my invention is to provide improved apparatus whereby to obtain operation in accordance with a predetermined function of the phase sequence components of the voltages of an alternating current circuit.

In measuring apparatus, relays and devices for line protection which take into account unbalanced voltages or currents, the equivalence between a system of any $q$-vectors which are concurrent and situated in one plane and $q$-systems each made up of $q$-symmetrical vectors (systems of balanced vectors) is employed. These vectors represent the components of an electric quantity, such as polyphase alternating voltages, currents, ampere turns, fluxes or magnetic fields, etc., according to the case in point.

In one of these systems, called the positive phase sequence system, two cyclically consecutive vectors form between each other an angle $$\frac{2\pi}{q}$$

in the positive direction. In another system, called the negative phase sequence system, two cyclically consecutive vectors form between each other an angle of $$\frac{2\pi}{q}$$

in a direction opposite to that of the preceding.

In order to obtain the positive or negative phase sequence components of the currents, voltages, powers, etc. or of the functions of these quantities, circuit arrangements are generally utilized. The system from which the symmetrical components are thus obtained has the same number of phases as the basic or fundamental system. Thus, for example in the case of a system of three-phase currents, the positive or negative phase sequence components of ampere turns forming part of a three-phase system, etc., can be obtained.

It may be of interest to obtain the positive and negative phase sequence components or functions thereof pertaining to a system with a number of phases differing from that of a given system. Thus, for protecting or measuring a three-phase system, the positive or negative phase sequence components or functions thereof in a two-phase system unbalanced to the same extent, $$E = \frac{I}{D},$$

as the three-phase system under consideration, D being the length of one of the vectors of the positive phase sequence system and I the length of a vector of the negative phase sequence system.

In this connection the given system of voltages or currents, taken as three-phase will be converted into a two-phase system of currents, voltages, ampere turns, fields or magnetic fluxes, etc., unbalanced to the same extent, that is the ratio of the positive and negative phase sequence components of each system is the same. Suitable circuit arrangements will then be applied to this latter equipment enabling its positive or negative phase sequence components or functions thereof to be obtained or circuit arrangements will be used starting from a three-phase system of voltages or currents enabling the positive or negative phase sequence components or functions thereof to be obtained directly from a two-phase system unbalanced to the same degree as the first.

My invention includes line protecting devices, relays, measuring apparatus and devices in which the unbalance of the circuits or lines, characterized by the application of the principles indicated above, that is, by the use of devices some of which are known to the art such as the Scott system, rotating field phase, transformers, etc., plays a part enabling the positive or negative phase sequence components, or functions thereof of a system with a number of phases differing from that of the circuit to be protected or on which the measurements are taken, to be obtained.

The number of phases of the intermediary system will be chosen so as to simplify the construction of the apparatus or other circuit arrangements. Further, the passing from one system to another may be made outside or inside the apparatus or device.

My invention will be better understood from the following description when considered in connection with the accompanying drawings and its scope will be pointed out in the appended claims.

This application is a division of my application, Serial No. 129,032, filed August 13, 1926, for devices responsive to unbalanced currents or voltages.

In the accompanying drawings, Fig. 1 illustrates diagrammatically electroresponsive apparatus embodying my invention; Figs. 2 and 3 illustrate diagrammatically modifications of my invention; and Figs. 4 and 5 are vector diagrams explanatory of my invention.

In the illustrated embodiments of my invention it will be assumed that measurements are to be made on a three-phase system or that a three-phase circuit is to be protected and that the three-phase system of voltages is transformed into a two-phase system of voltages, ampere turns, fluxes or magnetic fields, etc. This transformation enables the essential properties of two-phase systems to be utilized, that is, to have only two vectors which, in balanced systems, are 90° out of phase with each other.

In Fig. 4, let $X_1$ and $X_2$ be the two vectors of a two-phase system. The positive phase sequence component of the vector $X_1$ will be $$2X_{1_d} = X_1 + jX_2$$

where $j = \sqrt{-1}$, and the negative phase sequence component will be $$2X_{1_i} = X_1 - jX_2.$$

For vector $X_2$ the positive phase sequence component will be $$2X_{2_d} = X_2 - jX_1 = -j(X_1 + jX_2) = -2jX_{1_d}.$$

Similarly the negative phase sequence component will be $$2X_{2_i} = X_2 + jX_1 = j(X_1 - jX_2) = 2jX_{1_i}.$$

From these formulae, twice the positive phase sequence components $$2X_{1_d} \text{ and } 2X_{2_d}$$

are obtained by adding to $X_1$ a vector $jX_2$ equal to $X_2$ and leading $$\frac{\pi}{2}$$

in order to obtain $$2X_{1_d}$$

and by adding to $X_2$ a vector $-jX_2$ equal to $X_2$ and lagging $$\frac{\pi}{2}$$

in order to obtain $$2X_{1_d}.$$

In order to obtain the negative phase sequence components, vectors are added to $X_1$ and $X_2$ respectively equal to and directly opposite to those used for the positive phase sequence components.

In certain cases, it may not be convenient to obtain the values represented by the vectors $jX_1$, $jX_2$ or $-jX_1$, $-jX_2$. However, it will be observed from Fig. 4 that the positive and negative phase sequence components of $X_1$ are obtained by adding geometrically to a vector equal to $X_1$ a vector of length $X_2$ making with it an angle $$\left(\frac{3\pi}{2} - \alpha\right) \text{ and } \left(\alpha - \frac{\pi}{2}\right)$$

respectively in a suitable direction. Similarly, in order to obtain the positive and negative phase sequence components of $X_2$, a vector of length $X_1$ is added geometrically to $X_2$, making with $X_2$ angles of $$\left(\frac{3\pi}{2} - \alpha\right) \text{ and } \left(\alpha - \frac{\pi}{2}\right)$$

respectively in a suitable direction.

Often the length of $$X_{1_d} \text{ or } X_{2_d}$$

only is required or of $$X_{1_i} \text{ or } X_{2_i}.$$

In this case, to obtain for example a positive phase sequence component, a vector $X'_1$ may be taken instead of $X_1$ of a length $kX_1$ equal to or proportional to the length of $X_1$ and out of phase with respect to it by an angle $\beta$ lagging for example as shown in Fig. 5. If a vector $X'_2$ is added to it of length $kX_2$ equal or proportional to $X_2$ with the same coefficient of proportion, but leading by $$\frac{\pi}{2}$$

with respect to $X'_2$ hence by $$\left(\frac{\pi}{2} - \beta\right)$$

with respect to $X_2$, the resultant of the two vectors thus obtained will give a vector $$X'_{1_d} \text{ of length } kX_{1_d}$$

equal or proportional to $$X_{1_d}$$

and lagging it by angle $\beta$. Similar remarks can be made concerning the other components of $X_1$ and $X_2$.

From the foregoing it follows that values can be obtained equal or proportional to the positive or negative phase sequence components of the given out-of-phase values by producing suitable phase displacements, leading or lagging, of angles differing from $$\frac{\pi}{2}$$

by means of resistances, reactances, self or mutual inductances, capacities, transformers, short-circuited windings, etc.

Fig. 1 shows the connection arrangement of relay or voltage responsive apparatus of the induction type in which a torque proportional to $E^2_d + E^2_i$ is obtained, $E_d$ being the positive phase sequence component and $E_i$ the negative phase sequence component of the three-phase system of voltages, $(e_1, e_2, e_3)$.

In a three-phase circuit:

$$E^2_d + E^2_i = E^2_1 + E^2_2 + E^2_3$$

$E_1$, $E_2$, and $E_3$ being the virtual or effective values of the three voltages $e_1$, $e_2$, $e_3$. In order to obtain $E^2_d + E^2_i$ it would thus be necessary to use three substantially identical electromagnets acting on the same metallic disk $d$ and giving torques proportional to the squares of the voltage, that is, $E^2_1$, $E^2_2$, $E^2_3$.

In the arrangement shown in Fig. 1, the three-phase line to line voltage system of an electric circuit comprising conductors 1, 2, 3 is converted into a two-phase system by means of a Scott connected transformer the primaries of which are AB and CD and the secondaries $\alpha\beta$ and $\gamma\delta$. The movable member or disk $d$ is subjected to the influence of two motoring elements such as electromagnets $a$ and $b$ inductively associated with the disk. These electromagnets may be identical if the correct transformation ratios of the Scott connected transformer are suitably chosen. With this arrangement, the windings of the electromagnets $a$ and $b$ are energized respectively in accordance with a voltage between two of the phase conductors such as 1—2 and a voltage which is a resultant of substantially one-half of the voltage between the phase conductor 3. There are thus obtained tween one of these conductors and the third phase conductor 3. There are thus obtained two voltages in quadrature when the three line to line voltages of the circuit 1, 2, 3 are balanced. These two phase voltages are the voltages between the points AB and between the points CD. In other words, if the three-phase circuit 1, 2, 3 is balanced, the ampere turns of the two electromagnets $a$, $b$ are in quadrature. In this case, a two-phase system of ampere turns is obtained which is balanced at the same time as the three-phase system of voltages and a torque given by the two suitably arranged electromagnets would be proportional to $E^2_d + E^2_i$.

The electroresponsive devices may be arranged to control the circuit 1, 2, 3 through suitable circuit interrupting means shown as a latched-in circuit breaker Z provided with a trip coil P having contacts in its circuit arranged to be controlled by a contact finger R movable with the disk $d$.

In the arrangement shown in Fig. 2, two voltages in quadrature are obtained when the voltages of the three-phase circuit 1, 2, 3 are balanced. These two phase voltages are the voltages between the points A, B and between the points C, D. As shown, the latter is applied directly to the windings B but the former is transformed by means of the transformer AB, to supply the winding $a$.

Where the electric system includes a three-phase potential transformer T as shown, for example, in Fig. 3, the windings of the electromagnets $a$ and $b$ may be connected to the terminals of the delta connected winding as shown to obtain the desired two-phase or in quadrature voltages. In this case assuming equal turn ratios between the different phases of the transformer T and $n$ the number of turns in the winding of the electromagnet $a$ then the number of turns in the electromagnet $b$ would be $$n\frac{\sqrt{3}}{2}$$

for equal effects under balanced conditions.

While I have shown and described my invention in considerable detail, I do not desire to be limited to the exact arrangements shown, but seek to cover in the appended claims all those modifications that fall within the true spirit and scope of my invention.

What I claim as new and desire to secure by Letters Patent of the United States is:

1. In electroresponsive apparatus for a three-phase circuit, a movable member, electromagnetic means including windings connected to be energized from said circuit for exerting on said member a force dependent on the sum of the squares of the phase sequence components of a two-phase system of voltages derived from and unbalanced to the same extent as the voltages of the three-phase circuit.

2. In electroresponsive apparatus for a polyphase circuit, a movable member of electric current conducting material and electromagnetic means inductively associated with said member and including windings connected to be energized from said circuit for exerting on said member a force dependent on a predetermined sum function of the squares of the phase sequence components of a system of voltages derived from and unbalanced to the same extent as the voltages of the polyphase circuit and having a different number of phases.

3. In combination with a three-phase circuit, electroresponsive apparatus including a movable member and actuating means therefor including two electromagnets respectively connected to be energized in accordance with the voltage between two of the phase conductors of the circuit and another voltage which is a resultant of substantially one-half of said first voltage and the voltage between one of said phase conductors and the third phase conductor.

4. In combination with a three-phase circuit, electroresponsive apparatus including a movable disk of electric current conducting material and actuating means therefor including two electromagnets inductively associated with said disk and connected to be energized from said circuit respectively in accordance with two like components of voltage displaced substantially 90° in phase relation under balanced circuit conditions and having effective values dependent on the components of the voltage of the circuit.

5. In combination with a three-phase circuit, electroresponsive apparatus including a movable disk of electric current conducting material and actuating means therefor including two electromagnets inductively associated with said disk and connected to be energized from the voltages of said circuit by two voltages respectively displaced substantially 90° in phase relation under balanced circuit conditions and having effective values dependent on the voltages of said circuit.

6. In combination with a three-phase circuit, electroresponsive apparatus including a polyphase potential transformer connected to be energized from the circuit, a movable member and actuating means therefor including two electromagnets each arranged to exert a force on the member, the windings of said electromagnets being connected to said transformer to be energized respectively in accordance with the components of a voltage of a two-phase system having effective values dependent on the components of the corresponding voltage of the three-phase circuit.

7. In combination with a three-phase circuit, electroresponsive apparatus including a polyphase transformer connected to be energized from the circuit, a disk of electric current conducting material and actuating means therefor including two independent electromagnets respectively arranged to exert additive torques on the disk, the windings of said electromagnets being connected to said transformer to be energized respectively in accordance with the components of the voltage of a two-phase system having effective values proportional to the components of the voltage of the three-phase circuit.

In witness whereof, I have hereunto set my hand this 21st day of June, 1929.

EMILE GRASSOT.

Certificate of Correction

Patent No. 1,816,773.                                        Granted July 28, 1931, to

EMILE GRASSOT

It is hereby certified that error appears in the printed specification of the above-numbered patent requiring correction as follows: Page 2, line 48, strike out the formula and insert instead $2X_2 = X_2 + jX_1 = j(X_1 - jX_2) = 2jX_1$; same page, line 65, for "$2X_1$", read $2X_1$; lines 97 and 98, for "$X_1$ or $X_2$." read $X_1$ or $X_2$; page 3, line 45, after " phase ", insert *conductors 1—2 and the voltage between one of these conductors and the third phase*, and lines 45 to 47 strike out " There are thus obtained tween one of these conductors and the third phase conductor 3."; same page, line 117, claim 2, for " said " read *the;* and that the said Letters Patent should be read with these corrections therein that the same may conform to the record of the case in the Patent Office.

Signed and sealed this 15th day of September, A. D. 1931.

[SEAL.]                                                                           M. J. MOORE,
*Acting Commissioner of Patents.*